United States Patent
Ohnishi

(10) Patent No.: US 8,861,088 B2
(45) Date of Patent: Oct. 14, 2014

(54) OPTICAL FILTER

(75) Inventor: Manabu Ohnishi, Kakogawa (JP)

(73) Assignee: Daishinku Corporation, Kakogawa-shi (JP)

( * ) Notice: Subject to any disclaimer, the term of this patent is extended or adjusted under 35 U.S.C. 154(b) by 204 days.

(21) Appl. No.: 13/130,071

(22) PCT Filed: Sep. 9, 2010

(86) PCT No.: PCT/JP2010/065508
§ 371 (c)(1),
(2), (4) Date: May 19, 2011

(87) PCT Pub. No.: WO2011/033984
PCT Pub. Date: Mar. 24, 2011

(65) Prior Publication Data
US 2011/0228399 A1 Sep. 22, 2011

(30) Foreign Application Priority Data
Sep. 15, 2009 (JP) ................................ 2009-213348

(51) Int. Cl.
*G02B 5/28* (2006.01)
*G02B 1/10* (2006.01)
*G02B 23/12* (2006.01)

(52) U.S. Cl.
CPC ............. *G02B 5/281* (2013.01); *G02B 23/12* (2013.01); *G02B 5/285* (2013.01)
USPC ............ 359/590; 359/589; 359/588; 359/586

(58) Field of Classification Search
USPC .......................... 359/586, 587, 588, 589, 590
See application file for complete search history.

(56) References Cited

U.S. PATENT DOCUMENTS 5,138,219 A * 8/1992 Krisl et al. ..................... 313/112
7,570,428 B2 * 8/2009 Watanabe ....................... 359/586

FOREIGN PATENT DOCUMENTS

| JP | 2006-010764 A | 1/2006 |
| JP | 2006-157413 A | 6/2006 |
| JP | 2006-023471 A | 1/2007 |
| JP | 2007-183525 A | 7/2007 |

* cited by examiner

Primary Examiner — Audrey Y Chang
(74) Attorney, Agent, or Firm — Marvin A. Motsenbocker; MOTS Law, PLLC

(57) ABSTRACT

An optical filter 13 is provided with a quartz plate 2 and a filter group 3. The filter group 3 is constituted by combining a first filter 33 having transmission characteristics in the visible region and one preset band of the infrared region that is contiguous with the visible region, and a second filter 35 and a third filter 36 each having transmission characteristics in the visible region and another preset band of the infrared region that is removed from the visible region and having blocking characteristics in a band between the visible region and the other band of the infrared region. In the second filter 35 and the third filter 36, each of the bands in which blocking characteristics are obtained is approximately 150 nm or less, and the bands in which blocking characteristics are obtained overlap.

9 Claims, 7 Drawing Sheets

OPTICAL FILTER

TECHNICAL FIELD

The present invention relates to an optical filter for providing in an imaging device.

BACKGROUND ART

In the optical system of an electronic camera typified by a common video camera, digital still camera or the like, a coupled optical system, an infrared cut filter, an optical low-pass filter, and an imaging element such as a CCD (Charge Coupled Device) or a MOS (Metal Oxide Semiconductor) are arranged in order along the optical axis from the object side (e.g., see Patent Literature 1). Note that the imaging element referred to here has sensitivity to light having a wider wavelength band than light having a wavelength band perceptible to the human eye (visible light). Thus, the imaging element also responds to light in infrared and ultraviolet regions in addition to visible light.

The human eye responds to light having wavelengths in a range of about 400 nm to 620 nm in dark ambient, and responds to light having wavelengths in a range of about 420 nm to 700 nm in bright ambient. In contrast, a CCD, for example, is highly sensitive to light having wavelengths in a range of 400 nm to 700 nm, and also responds to light having wavelengths below 400 nm and above 700 nm.

With the imaging device disclose in the following Patent Literature 1, an infrared cut filter is thus provided in addition to a CCD serving as the imaging element, so as to prevent light in an infrared region from reaching the imaging element, such that captured images approximating the human eye are obtained.

CITATION LIST

Patent Literature

Patent Literature 1: JP 2000-209510A

DISCLOSURE OF THE INVENTION

Problem to be Solved by the Invention

Incidentally, apart from common video cameras and digital still cameras, there are imaging devices such as surveillance cameras that are used in other applications different from normal image capture.

For example, surveillance cameras need to perform surveillance image capture not only during the day but also with night vision at night. Because image capture under night vision conditions such as at night is performed in a state invisible to the human eye, a camera designed to perform image capture in a normal visible region will be unable to perform image capture under night vision conditions. Thus, image capture under night vision conditions such as at night is currently performed using light in an infrared region, but the imaging device disclosed in the above Patent Literature 1 cannot be used to perform image capture with night vision because of being provided with an infrared cut filter for cutting light in an infrared region.

In view of this, to solve the above problems the present invention has as its object to provide an optical filter capable of transmitting light not only during the day with natural light but also under night vision conditions such as at night.

Means for Solving the Problem

In order to attain the above object, an optical filter for providing in an imaging device according to the present invention is provided with a transparent substrate, and a filter group formed on the transparent substrate and having transmission characteristics over two wavelength bands consisting of a visible region and an infrared region. The filter group is constituted by combining a first filter having transmission characteristics in the visible region and one preset band of the infrared region that is contiguous with the visible region, and a plurality of filters each having transmission characteristics in the visible region and another preset band of the infrared region that is removed from the visible region and having blocking characteristics in a band between the visible region and the other band of the infrared region, and in the plurality of filters, each of the bands in which blocking characteristics are obtained is approximately 150 nm or less, and the bands in which blocking characteristics are obtained overlap.

The present invention enables transmission characteristics to be obtained in the visible region and a desired infrared region, and as a result enables image capture to be performed not only during the day with natural light but also under night vision conditions such as at night.

Also, the present invention enables transmission characteristics to be obtained only in the visible region and a desired infrared region, because in the plurality of filters each of the bands in which blocking characteristics are obtained is approximately 150 nm or less and the bands in which blocking characteristics are obtained overlap.

Incidentally, combining the first filter, as it is called in the present invention, with one other conventional filter does enable transmission characteristics to be obtained in an infrared region in addition to the visible region, although in this case, apart from in the visible region, transmission characteristics cannot be obtained in a band at or below approximately 900 nm that is close to the visible region. However, the present invention enables transmission characteristics to be obtained in the visible region and a band at or below approximately 900 nm that is close to but removed from the visible region, or only in a band at or below approximately 900 nm.

In the above configuration, the filter group may include a plurality of layers formed by alternately laminating a first thin film composed of a high refractive index material and a second thin film composed of a low refractive index material, the high refractive index material may be one of $TiO_2$, $Nb_2O_5$ and $Ta_2O_5$, and the low high refractive index material may be one of $SiO_2$ and $MgF_2$.

Note that in the case of an optical filter having blocking characteristics in which $TiO_2$, $Nb_2O_5$ or $Ta_2O_5$ is used for the high refractive index material and $SiO_2$ or $MgF_2$ is used for the low refractive index material, the width of the blocking band thereof will basically be about 250 nm and is not readily changed. This has to do with the fact that the width of the blocking band is decided by the reflective index of the optical material. Thus, in the case of an optical filter that uses these materials and has transmission characteristics over two bands consisting of a visible region and an infrared region, the transmission band of the infrared region will be above 900 nm, and the rising wavelength of the transmission band in the infrared region cannot be set arbitrarily.

However, the present configuration enables transmission characteristics to be obtained in the visible region and a band at or below approximately 900 nm that is close to but removed from the visible region, or only in a band at or below approximately 900 nm, because of the transparent substrate and the filter group being provided, the filter group being constituted by combining the first filter and the plurality of filters, and including a plurality of layers formed by alternately laminating the first thin film composed of a high reflective index material and the second thin film composed of a low reflective index material, $TiO_2$, $Nb_2O_5$ or $Ta_2O_5$ being used for the high refractive index material and $SiO_2$ or $MgF_2$ being used for the low refractive index material, and the bands in which blocking characteristics are obtained in the plurality of filters respectively being approximately 150 nm or less and overlapping. As a result, the wavelengths of light from an infrared LED lamp for use in night image capture can be transmitted not only during the day with natural light but also under night vision conditions such as at night.

In the above configuration, the filter group may include a plurality of layers formed by alternately laminating a first thin film composed of a high refractive index material and a second thin film composed of a low refractive index material, and in each of the plurality of filters, an optical film thickness ratio of an optical film thickness of a total number of laminations of the first thin film with respect to an optical film thickness of a total number of laminations of the second thin film may be set from approximately 1:0.5 to approximately 1:0.75.

In this case, the blocking characteristics of each of the plurality of filters can be set in a band of approximately 150 nm or less, and transmission characteristics only in the visible region and a desired band of the infrared region can be obtained. As a result, transmission characteristics can be obtained in the visible region and a band at or below approximately 900 nm that is close to but removed from the visible region, or only in a band at or below approximately 900 nm.

In the above configuration, the filter group may include a plurality of layers formed by alternately laminating a first thin film composed of a high refractive index material and a second thin film composed of a low refractive index material, and in each of the plurality of filters, an optical film thickness ratio of an optical film thickness of a total number of laminations of the first thin film with respect to an optical film thickness of a total number of laminations of the second thin film may be set from approximately 0.45:1 to approximately 0.7:1.

In this case, the blocking characteristics of each of the plurality of filters can be set in a band of approximately 150 nm or less, and transmission characteristics only in the visible region and a desired band of the infrared region can be obtained. As a result, transmission characteristics can be obtained in the visible region and a band at or below approximately 900 nm that is close to but removed from the visible region, or only in a band at or below approximately 900 nm.

In the above configuration, the bands in which the filter group have transmission characteristics may be the visible region and approximately 800 nm to approximately 1000 nm.

In this case, transmission only in bands consisting of a visible region and approximately 800 nm to approximately 1000 nm of a near infrared region close to this visible region that is not normally realizable by combining two filters is realized by the combination of the first filter and the plurality of filters. Thus, it is possible to accommodate the main center wavelength of an infrared LED lamp for use in night image capture (e.g., approx. 840, approx. 950, etc.), and reliably perform blocking of unnecessary near and far infrared light outside of these wavelength bands. As a result, transmission in an infrared region using an LED light source such as an LED lamp is possible, this being suitable for image capture under night vision conditions such as at night.

In the above configuration, the plurality of filters may be a second filter whose blocking characteristics are set in a band between approximately 600 nm and approximately 750 nm, and a third filter whose blocking characteristics are set in a band between approximately 700 nm and approximately 900 nm.

In this case, transmissivity of 3% or less is possible in the band in which blocking characteristics are obtained between two transmission bands, without causing light ripple in an adjacent near infrared region from a reactive portion of the (bright ambient) sensitivity characteristics of the human eye (e.g., to an adjustment portion of the center wavelength of an LED lamp whose light intensity has a center wavelength of approx. 840 nm). Note that, specifically, in the case where the band in which the second filter has blocking characteristics is set between approximately 650 nm and approximately 750 nm, and the band in which the third filter has blocking characteristics is set between approximately 750 nm and approximately 900 nm, light from an LED lamp whose light intensity has a center wavelength of approximately 950 nm can be efficiently captured.

In the above configuration, the filter group may include an adjustment layer that is positioned where a refractive index changes.

In this case, inclusion of the adjustment layer in the filter group enables the occurrence of ripple to be suppressed, particularly the occurrence of ripple in a wavelength region that is to be transmitted, and the amount by which transmissivity shifts when sharply displaced can also be suppressed.

In the above configuration, the transmission width in the infrared region is approximately 65 nm to approximately 200 nm.

In this case, the transmission width in the infrared region can be set to a narrow desired width, and, specifically, it is possible to transmit only the wavelengths of light from an infrared LED lamp for use in night image capture (irradiation wavelength width of approx. about 100 nm), enabling light irradiated from the LED lamp and reflected by the object to be efficiently captured.

Also, to attain the above object, an optical filter for providing in an imaging device according to the present invention is provided with a transparent substrate, and a filter group formed on the transparent substrate and having transmission characteristics over two wavelength bands consisting of a visible region and an infrared region. The filter group is constituted by combining a first filter having transmission characteristics in the visible region and one preset band of the infrared region that is contiguous with the visible region, and a plurality of filters each having transmission characteristics in the visible region and another preset band of the infrared region that is removed from the visible region and having blocking characteristics in a band between the visible region and the other band of the infrared region, and includes a plurality of layers formed by alternately laminating a first thin film composed of a high refractive index material and a second thin film composed of a low refractive index material, and in each of the plurality of filters, an optical film thickness ratio of an optical film thickness of a total number of laminations of the first thin film with respect to an optical film thickness of a total number of laminations of the second thin film is set in a range from approximately 1:0.5 to approximately 1:0.75, and the bands in which blocking characteristics are obtained overlap. The present invention enables transmission characteristics to be obtained only in the visible region and a desired band of an infrared region, because in each of the plurality of filters an optical film thickness ratio of the optical film thickness of the total number of laminations of the first thin film with respect to the optical film thickness of the total number of laminations of the second thin film is set from approximately 1:0.5 to approximately 1:0.75, and the bands in which blocking characteristics are obtained overlap.

Also, to attain the above object, an optical filter for providing in an imaging device according to the present invention is provided with a transparent substrate, and a filter group formed on the transparent substrate and having transmission characteristics over two wavelength bands consisting of a visible region and an infrared region. The filter group is constituted by combining a first filter having transmission characteristics in the visible region and one preset band of the infrared region that is contiguous with the visible region, and a plurality of filters each having transmission characteristics in the visible region and another preset band of the infrared region that is removed from the visible region and having blocking characteristics in a band between the visible region and the other band of the infrared region, and includes a plurality of layers formed by alternately laminating a first thin film composed of a high refractive index material and a second thin film composed of a low refractive index material, and in each of the plurality of filters, an optical film thickness ratio of an optical film thickness of a total number of laminations of the first thin film with respect to an optical film thickness of a total number of laminations of the second thin film is set in a range from approximately 0.45:1 to approximately 0.7:1, and the bands in which blocking characteristics are obtained overlap. The present invention enables transmission characteristics to be obtained only in the visible region and a desired band of an infrared region, because in each of the plurality of filters an optical film thickness ratio of the optical film thickness of the total number of laminations of the first thin film with respect to the optical film thickness of the total number of laminations of the second thin film is set from approximately 0.45:1 to approximately 0.7:1, and the bands in which blocking characteristics are obtained overlap.

The present invention enables transmission characteristics to be obtained in the visible region and a desired infrared region, and as a result enables image capture to be performed not only during the day with natural light but also under night vision conditions such as at night.

Incidentally, combining the first filter, as it is called in the present invention, with one other conventional filter does enable transmission characteristics to be obtained in the infrared region in addition to the visible region, although in this case, apart from in the visible region, transmission characteristics cannot be obtained in a band at or below approximately 900 nm that is close to the visible region. However, the present invention enables the respective bands in which blocking characteristics are obtained in the plurality of filters to be set to approximately 150 nm or less, enabling transmission characteristics to be obtained only in the visible region and a desired band of the infrared region. As a result, transmission characteristics can be obtained in the visible region and a band at or below approximately 900 nm that is close to but removed from the visible region, or only in a band at or below approximately 900 nm.

Effects of the Invention

The present invention enables provision of an optical filter and an imaging device that enable image capture not only during the day with natural light but also under night vision conditions such as at night.

BEST MODE FOR CARRYING OUT THE INVENTION

Hereinafter, an embodiment of the present invention will be described with reference to the drawings.

Figure 1:
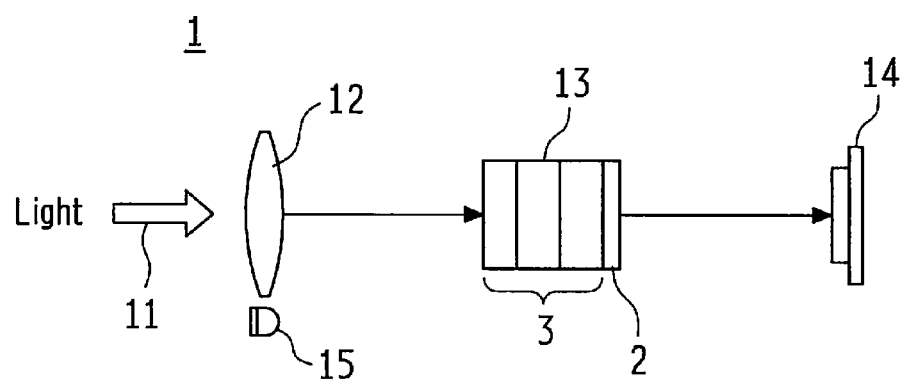
FIG. 1 is a schematic configuration diagram of an imaging device according to an embodiment.

In an imaging device 1 according to the present embodiment, at least a lens 12 serving as a coupled optical system on which external light is incident, an optical filter 13, and an imaging element 14 such as a CCD or a CMOS are arranged in order along an optical axis 11 from the object side on the outside, as shown in FIG. 1. Note that this imaging device 1 is provided with an LED lamp 15, and night image capture assistance is provided by irradiating the LED lamp 15 toward the object at night. In the present embodiment, light having a peak wavelength of 850 nm is irradiated from the LED lamp.

Figure 2:
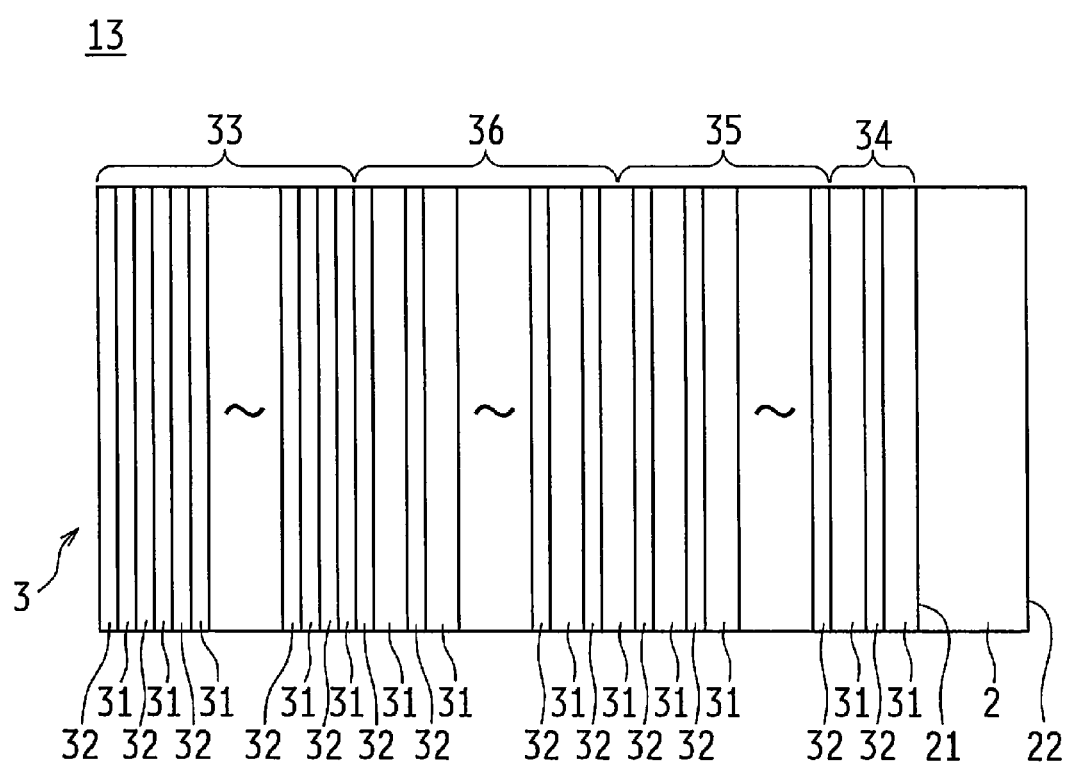
FIG. 2 is a schematic configuration diagram showing a configuration of an optical filter according to an embodiment.

The optical filter 13 is provided with a quartz plate 2 serving as a transparent substrate, a filter group 3 formed on one main face 21 of this quartz plate 2 and having transmission characteristics over two wavelength bands consisting of a visible region and an infrared region, and an AR coat (not shown) formed on the other main face 22 of the quartz plate 2, as shown in FIGS. 1 and 2. Note that the filter group 3, while corresponding to IR cut filters, in actual fact differs from IR cut filters because of having transmission characteristics in an infrared region.

The filter group 3 includes a plurality of layers formed by alternately laminating a first thin film 31 composed of a high refractive index material and a second thin film 32 composed of a low refractive index material. Thus, odd-numbered layers counting from the one main face 21 side of the quartz plate 2 are constituted by the first thin film 31, and even-numbered layers are constituted by the second thin film 32. Note that in this embodiment, $TiO_2$ is used for the first thin film and $SiO_2$ is used for the second thin film, and the filter group 3 is constituted by a plurality of layers defined by ordinal numbers from the one main face 21 side of the quartz plate 2, and in the present embodiment is constituted by layers 1 through 49. The respective layers 1 through 49 are constituted by laminating the first thin film 31 and the second thin film 32. Also, the thicknesses of the respective layers 1 through 49 differ as a result of the optical film thicknesses of the laminated first thin film 31 and second thin film 32 being different. Note that the optical film thickness referred to here is derived by the following Equation 1.

$$Nd=\lambda/4 \qquad (1)$$

where Nd is the optical film thickness, d is the physical film thickness, N is the refractive index and λ is the center wavelength.

Regarding the method for manufacturing this filter group 3, TiO$_2$ and SiO$_2$ are alternately vacuum deposited onto the one main face 21 of the quartz plate 2 by a known vacuum depositor (not shown) to form a filter group 3 such as shown in FIG. 2. Note that film thickness adjustment of the first thin film 31 and the second thin film 32 is carried out by performing deposition while monitoring film thickness, and closing a shutter (not shown) provided close to a deposition source (not shown) at the point at which a prescribed film thickness is reached, for instance, to stop deposition of the deposition material (TiO$_2$, SiO$_2$).

Also, the above filter group 3 is constituted by combining a first filter 33 having transmission characteristics in a visible region and one preset band of an infrared region that is contiguous with the visible region, a plurality of filters each having transmission characteristics in a visible region and another preset band of the infrared region that is removed from the visible region and having blocking characteristics in a band between the visible region and the other band of the infrared region, and an adjustment layer 34 positioned where the refractive index changes. Note that the position of the adjustment layer 34 where the refractive index changes in the present embodiment is an interface between the plurality of filters and the quartz plate 2, with the adjustment layer 34 being interposed between the plurality of filters and the quartz plate 2.

Figure 3:
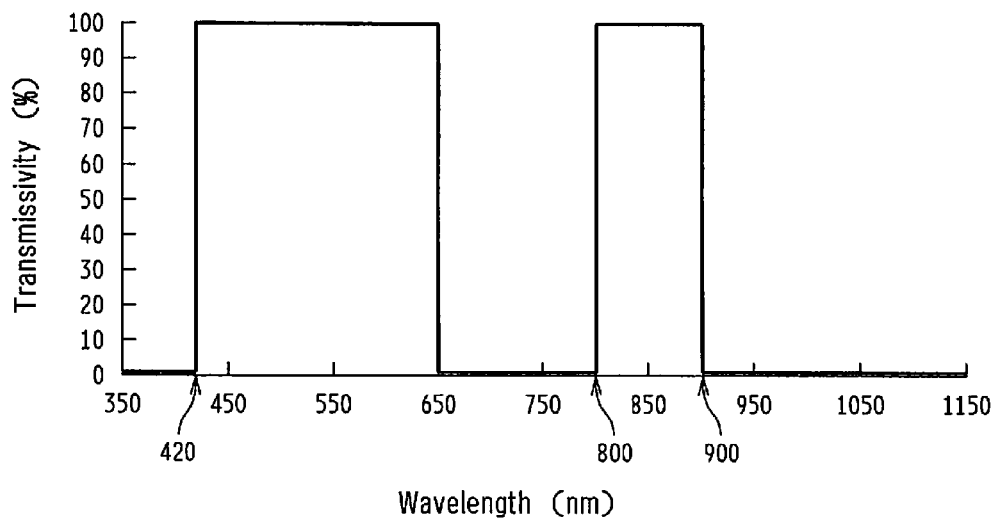
FIG. 3 is a schematic diagram showing transmission characteristics of an optical filter according to an embodiment.
Figure 4:
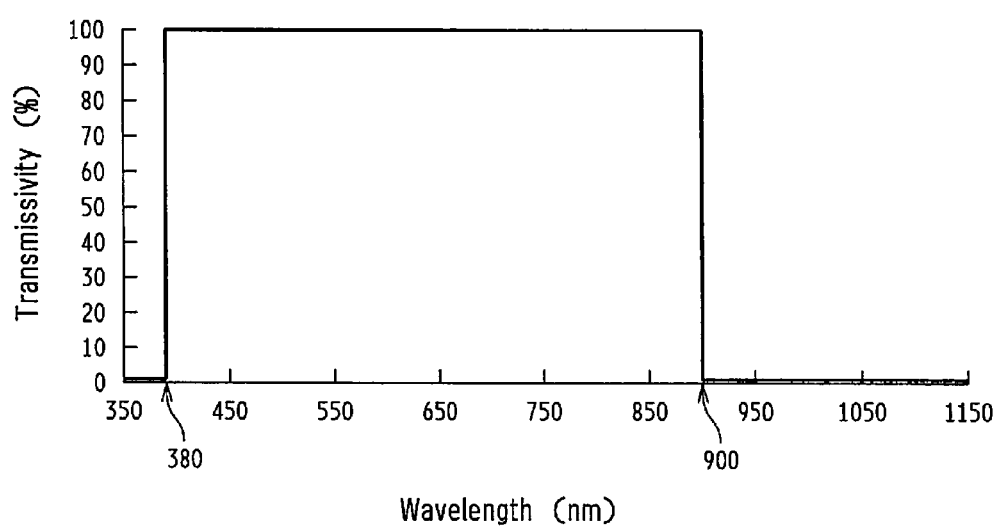
FIG. 4 is a schematic diagram showing transmission characteristics of a first filter according to an embodiment.

The bands (also referred to as transmission bands) in which this filter group 3 has transmission characteristics are, as shown in FIG. 3, a visible region (in the present embodiment, approx. 420 nm to approx. 650 nm) and a near infrared band (in the present embodiment, approx. 100 nm from approx. 800 nm to approx. 900 nm) of a near infrared region that is near the visible region. Note that the critical values (upper and lower limits) of the transmission band and the blocking band of the filter group 3 are not respectively limited to precise values, as indicated by the term "approximately".

Next, the first filter 33 and the plurality of filters of the filter group 3 will be respectively described.

The first filter 33 has transmission characteristics in one preset band (in the present embodiment, approx. 380 nm to approx. 900 nm) of an infrared region that is contiguous with the visible region. Specifically, the first filter 33 has transmission characteristics from approximately 380 nm to approximately 900 nm and blocking characteristics below approximately 380 nm and above approximately 900 nm. The first thin film 31 and the second thin film 32 of this first filter 33 are designed as follows. Note that the critical values (upper and lower limits) of the transmission band and the blocking band of the first filter 33 are not respectively limited to precise values, as indicated by the term "approximately".

TiO$_2$, which is a high refractive index material, is used for the first thin film 31, and SiO$_2$, which is a low refractive index material, is used for the second thin film 32. The optical film thickness ratio of the optical film thickness of the total number of laminations of the first thin film 31 with respect to the optical film thickness of the total number of laminations of the second thin film 32 in the first filter 33 is set to approximately 1:1. Note that the optical film thickness ratio referred to here is not limited to a precise value, as indicated by the term "approximately".

With the plurality of filters, each of the bands in which blocking characteristics are obtained is approximately 100 nm or less, and the bands in which blocking characteristics are obtained overlap. In the present embodiment, the plurality of filters are constituted by a second filter 35 whose blocking characteristics are set in a band between approximately 650 nm and approximately 740 nm, and a third filter 36 whose blocking characteristics are set in a band between approximately 700 nm and approximately 800 nm. Also, as shown in FIG. 2, the third filter 36 is laminated on the second filter 35. Note that in the plurality of filters according to the present embodiment, each of the bands in which blocking characteristics are obtained is approximately 100 nm or less, although this is a favorable example that is not limiting, and each band in which blocking characteristics are obtained can be approximately 150 nm or less. Note also that the critical values (upper and lower limits) of the transmission bands and the blocking bands of the second filter 35 and the third filter 36 are not respectively limited to precise values, as indicated by the term "approximately".

Figure 5:
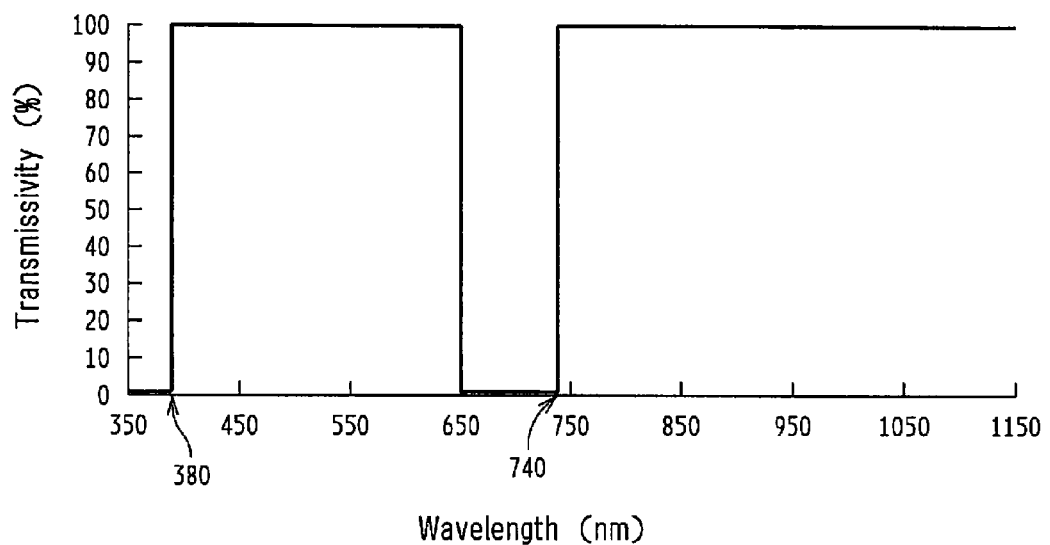
FIG. 5 is a schematic diagram showing transmission characteristics of a second filter according to an embodiment.

The second filter 35 has transmission characteristics in the visible region and another preset band (in the present embodiment, above approx. 740 nm) of the infrared region that is removed from the visible region, and has blocking characteristics in a band (in the present embodiment, approx. 650 nm to approx. 740 nm) between the visible region and the other band of the infrared region. Specifically, the second filter 35, as shown in FIG. 5, has transmission characteristics from approximately 380 nm to approximately 650 nm and above approximately 740 nm, and has blocking characteristics below approximately 380 nm and from approximately 650 nm to approximately 740 nm. The first thin film 31 and the second thin film 32 of this second filter 35 are designed as follows.

TiO$_2$, which is a high refractive index material, is used for the first thin film 31 of the second filter 35, and SiO$_2$, which is a low refractive index material, is used for the second thin film 32. Of the plurality of first thin films 31 of the second filter 35, the first thin film 31 positioned as the uppermost layer (left side shown in FIG. 2) of the second filter 35 is set to approximately half the physical film thickness of the other first thin films 31. Also, the optical film thickness ratio of the optical film thickness of the total number of laminations of the first thin film 31 with respect to the optical film thickness of the total number of laminations of the second thin film 32 in the second filter 35 is set from approximately 1.000:0.500 to approximately 1.000:0.750. Specifically, in the present embodiment, the optical film thickness ratio of the optical film thickness of the total number of laminations of the first thin film 31 with respect to the optical film thickness of the total number of laminations of the second thin film 32 is set to approximately 1.000:0.538. Note that the optical film thickness ratio referred to here is not limited to a precise value, as indicated by the term "approximately".

Figure 6:
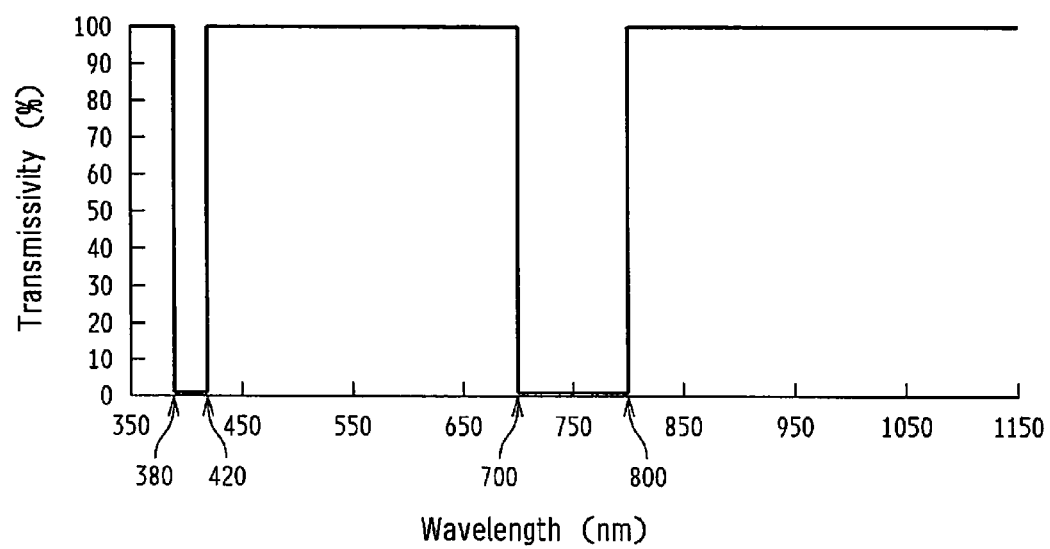
FIG. 6 is a schematic diagram showing transmission characteristics of a third filter according to an embodiment.

The third filter 36 has transmission characteristics in a visible region and another preset band (in the present embodiment, above approx. 800 nm) of the infrared region that is removed from the visible region, and has blocking characteristics in a band (in the present embodiment, approx. 700 nm to approx. 800 nm) between the visible region and the other band of the infrared region. Specifically, the third filter 36, as shown in FIG. 6, has transmission characteristics below approximately 380 nm, from approximately 420 nm to approximately 700 nm and above approximately 800 nm, and has blocking characteristics from approximately 380 nm to approximately 420 nm and from approximately 700 nm to approximately 800 nm. The first thin film 31 and the second thin film 32 of this third filter 36 are designed as follows.

TiO$_2$, which is a high refractive index material, is used for the first thin film 31 of the third filter 36, and SiO$_2$, which is a low refractive index material, is used for the second thin film 32. Of the plurality of first thin films 31 of the third filter 36, the first thin film 31 positioned as the lowermost layer (right side shown in FIG. 2) of the third filter 36 is set to approximately half the physical film thickness of the other first thin films 31. The optical film thickness ratio of the optical film thickness of the total number of laminations of the first thin film 31 with respect to the optical film thickness of the total number of laminations of the second thin film 32 in the third filter 36 is set from approximately 1.000:0.500 to approximately 1.000:0.750. Specifically, in the present embodiment, the optical film thickness ratio of the optical film thickness of the total number of laminations of the first thin film 31 with respect to the optical film thickness of the total number of laminations of the second thin film 32 is set to approximately 1.000:0.540. Note that the optical film thickness ratio referred to here is not limited to a precise value, as indicated by the term "approximately".

With the above second filter 35 and third filter 36, the first thin film 31 positioned as the uppermost layer (left side shown in FIG. 2) of the second filter 35 and the first thin film 31 positioned as the lowermost layer (right side shown in FIG. 2) of the third filter 36 are laminated to form a single first thin film 31.

As a result of the above configuration, transmission characteristics such as shown in FIG. 3 are obtained with the optical filter 13 according to the present embodiment.

Figure 7:
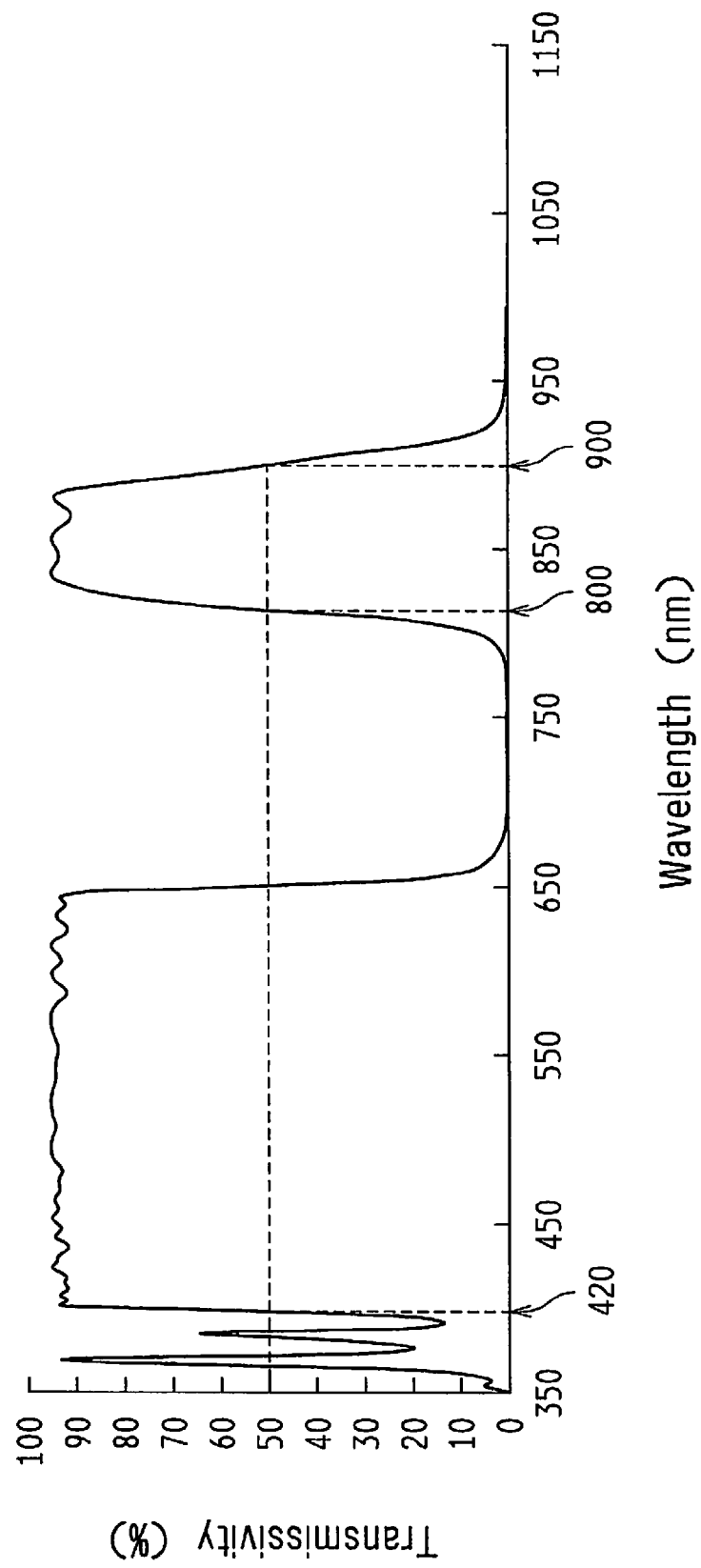
FIG. 7 shows transmission characteristics of an optical filter according to a working example.

Next, the wavelength characteristics of the optical filter 13 according to this embodiment were actually measured, and the measurement results and configurations are shown in FIG. 7 and Table 1 as working examples.

WORKING EXAMPLES

In the working examples, a quartz plate 2 having a refractive index of 1.54 in the atmosphere is used as the transparent substrate. Also, $TiO_2$ having a refractive index of 2.30 in the atmosphere is used as the first thin film 31, and $SiO_2$ having a refractive index of 1.46 in the atmosphere is used as the second thin film 32.

Also, the filter group 3 is composed of 49 layers, and the filter group 3 is constituted by forming the first thin film 31 and the second thin film 32 in an optimized state using the above method for manufacturing the filter group 3, and transmission characteristics such as shown in FIG. 7 were obtained. Note that in this working example, the angle of incidence of light is zero degrees, that is, light is normally incident.

TABLE 1

| Layer | Deposition Material | Optical Film Thickness | Center Wavelength (nm) |
|---|---|---|---|
| 1 | $SiO_2$ | 1.47 | 700.00 |
| 2 | $TiO_2$ | 0.39 | 700.00 |
| 3 | $SiO_2$ | 0.16 | 700.00 |
| 4 | $TiO_2$ | 0.82 | 700.00 |
| 5 | $SiO_2$ | 0.14 | 700.00 |
| 6 | $TiO_2$ | 1.49 | 700.00 |
| 7 | $SiO_2$ | 1.30 | 700.00 |
| 8 | $TiO_2$ | 1.43 | 700.00 |
| 9 | $SiO_2$ | 0.04 | 700.00 |
| 10 | $TiO_2$ | 1.27 | 700.00 |
| 11 | $SiO_2$ | 1.23 | 700.00 |
| 12 | $TiO_2$ | 1.05 | 700.00 |
| 13 | $SiO_2$ | 1.17 | 700.00 |
| 14 | $TiO_2$ | 1.28 | 700.00 |
| 15 | $SiO_2$ | 0.18 | 700.00 |
| 16 | $TiO_2$ | 1.39 | 700.00 |
| 17 | $SiO_2$ | 1.07 | 700.00 |
| 18 | $TiO_2$ | 1.13 | 700.00 |
| 19 | $SiO_2$ | 1.10 | 700.00 |
| 20 | $TiO_2$ | 1.36 | 700.00 |
| 21 | $SiO_2$ | 0.15 | 700.00 |
| 22 | $TiO_2$ | 1.33 | 700.00 |
| 23 | $SiO_2$ | 1.17 | 700.00 |
| 24 | $TiO_2$ | 1.08 | 700.00 |
| 25 | $SiO_2$ | 1.16 | 700.00 |
| 26 | $TiO_2$ | 1.34 | 700.00 |
| 27 | $SiO_2$ | 0.41 | 700.00 |
| 28 | $TiO_2$ | 0.23 | 700.00 |
| 29 | $SiO_2$ | 1.74 | 700.00 |
| 30 | $TiO_2$ | 1.34 | 700.00 |
| 31 | $SiO_2$ | 1.21 | 700.00 |
| 32 | $TiO_2$ | 1.42 | 700.00 |
| 33 | $SiO_2$ | 1.53 | 700.00 |
| 34 | $TiO_2$ | 1.56 | 700.00 |
| 35 | $SiO_2$ | 1.62 | 700.00 |
| 36 | $TiO_2$ | 1.51 | 700.00 |
| 37 | $SiO_2$ | 1.40 | 700.00 |
| 38 | $TiO_2$ | 1.36 | 700.00 |
| 39 | $SiO_2$ | 1.46 | 700.00 |
| 40 | $TiO_2$ | 1.54 | 700.00 |
| 41 | $SiO_2$ | 1.56 | 700.00 |
| 42 | $TiO_2$ | 1.51 | 700.00 |
| 43 | $SiO_2$ | 1.44 | 700.00 |
| 44 | $TiO_2$ | 1.42 | 700.00 |
| 45 | $SiO_2$ | 1.56 | 700.00 |
| 46 | $TiO_2$ | 0.34 | 700.00 |
| 47 | $SiO_2$ | 0.10 | 700.00 |
| 48 | $TiO_2$ | 1.10 | 700.00 |
| 49 | $SiO_2$ | 0.74 | 700.00 |

Table 1 shows the composition of the filter group 3 of the optical filter 13 and the optical film thicknesses of the thin films (first thin film 31, second thin film 32). The design wavelength of the present working example is 700 nm.

Also, in this working example, the filter group 3 is obtained by alternately laminating the first thin film 31 composed of a high refractive index and the second thin film 32 composed of a low refractive index to form 49 layers, as shown in Table 1. Layers 1 to 3 of the 49 layers of this filter group 3 are constituted as the adjustment layer 34, layers 4 to 29 are constituted as the plurality of filters, and layers 29 to 49 are constituted as the first filter 33. Note that the single first thin film 31 formed by laminating the first thin film 31 positioned as the uppermost layer (left side shown in FIG. 2) of the second filter 35 and the first thin film 31 positioned as the lowermost layer (right side shown in FIG. 2) of the third filter 36 is the first thin film constituting layer 29. Also, in the present working example, the film configurations (optical film thickness etc. of the first thin film 31 and second thin film 32) in the second filter 35 and the third filter 36 constituting the plurality of filters are similar.

As shown in FIG. 7, the optical filter 13 according to this working example transmits (at least 90% transmissivity) light of wavelengths from approximately 420 nm to approximately 650 nm constituting a visible region, transmits (at least 90% transmissivity) light of wavelengths in a band of approximately 100 nm from approximately 800 nm to approximately 900 nm constituting an infrared region (in particular, near infrared region), and blocks the remaining bands. Note that in the present working example a half-peak wavelength having a refractive index of 50% is taken as the critical value (upper and lower limit) of the transmission band and the blocking band. Thus, the transmission band of the infrared region in the present working example will be a band of approximately 100 nm from approximately 800 nm to approximately 900 nm.

The optical filter 13 according to the above present embodiment and working example enables transmission characteristics to be obtained in the visible region and a prescribed infrared region, and as a result enables image capture to be performed not only during the day with natural light but also under night vision conditions such as at night.

In particular, the optical filter 13 enables transmission characteristics to be obtained only in the visible region and a desired band of the infrared region, because of being composed of the quartz plate 2 and the filter group 3, the filter group 3 being constituted by combining the first filter 33 having transmission characteristics in the visible region and one preset band of the infrared region that is contiguous with the visible region, and the plurality of filters each having transmission characteristics in the visible region and another preset band of the infrared region that is removed from the visible region and having blocking characteristics in the band between the visible region and the other band of the infrared region, and the bands in which the plurality of filters have blocking characteristics respectively being approximately 150 nm or less (in the present embodiment, approx. 100 nm or less) and overlapping.

Incidentally, combining the first filter according to the present invention with one other conventional filter does enable transmission characteristics to be obtained in the infrared region in addition to the visible region, although in this case, apart from in the visible region, transmission characteristics cannot be obtained in a band at or below approximately 900 nm that is close to the visible region. However, the optical filter 13 enables transmission characteristics to be obtained in the visible region and a band at or below approximately 900 nm that is close to but removed from the visible region (in the present embodiment, only in a band at or below approximately 900 nm).

Specifically, in the present embodiment, the filter group 3 includes a plurality of layers formed by alternately laminating the first thin film 31 composed of a high refractive index material and the second thin film 32 composed a low refractive index material, with $TiO_2$ being used for the high refractive index material and $SiO_2$ being used for the low refractive index material. Incidentally, in the case of an optical filter having blocking characteristics obtained by using $TiO_2$ for the high refractive index material and $SiO_2$ for the low refractive index material, the width of the blocking band will basically be about 250 nm and is not readily changed. This has to do with the fact that the width of the blocking band is decided by the refractive index of the optical material. Thus, in the case of an optical filter in which such optical materials are used to obtained transmission characteristics over two bands consisting of a visible region and an infrared region, the transmission band in the infrared region will be above approximately 900 nm, and the rising wavelength of the transmission band in the infrared region cannot be arbitrarily set. For example, in the case where the value of the half peak on the short wavelength side of the blocking band is 650 nm when the width of the blocking band is about 250 nm, the value of the half peak on the long wavelength side of the blocking band will be above 900 nm because of the width of the blocking band being 250 nm.

However, the present embodiment enables transmission characteristics to be obtained in the visible region and a band close to the visible band of approximately 900 nm or less that is removed from the visible region (in the present embodiment, only in a band at or below approximately 900 nm), because of the quartz plate 2 and the filter group 3 being provided, the filter group 3 being constituted by combining the first filter 33, the second filter 35 and the third filter 36, and being formed by laminating the first thin film 31 composed of a high refractive index material and the second thin film 32 composed of a low refractive index material, $TiO_2$ being used for the high refractive index material and $SiO_2$ being used for the low refractive index material, and the bands in which the second filter 35 and the third filter 36 have blocking characteristics respectively being approximately 150 nm or less (in the present embodiment, approx. 100 nm or less) and overlapping. As a result, the wavelengths of light from an infrared LED lamp for use in night image capture can be transmitted not only during the day with natural light but also under night vision conditions such as at night.

Also, because the filter group 3 includes a plurality of layers formed by alternately laminating the first thin film 31 composed of a high refractive index material and the second thin film 32 composed of a low refractive index material, and the optical film thickness ratio of the optical film thickness of the total number of laminations of the first thin film 31 with respect to the optical film thickness of the total number of laminations of the second thin film 32 in the second filter 35 and the third filter 36 respectively is set from approximately 1.000:0.500 to approximately 1.000:0.750, the bands in which the second filter 35 and the third filter 36 respectively have blocking characteristics can be set to approximately 150 nm or less, enabling transmission characteristics to be obtained only in the visible region and a desired band in the infrared region. As a result, transmission characteristics can be obtained in the visible range and a band at or below approximately 900 nm that is close to but removed from the visible region (in the present embodiment, only in the visible region and a band of approx. 900 nm or less). Note that in the present embodiment the optical film thickness ratio of the optical film thickness of the total number of laminations of the first thin film 31 with respect to the optical film thickness of the total number of laminations of the second thin film 32 in the second filter 35 is set from approximately 1.000:0.500 to approximately 1.000:0.750, although the present invention is not limited hereto, and the optical film thickness ratio of the optical film thickness of the total number of laminations of the first thin film 31 with respect to the optical film thickness of the total number of laminations of the second thin film 32 in the second filter 35 may be set from approximately 0.450:1.000 to approximately 0.700:1.000. Even in this case, similar effects are obtained to the configuration in which the optical film thickness ratio of the optical film thickness of the total number of laminations of the first thin film 31 with respect to the optical film thickness of the total number of laminations of the second thin film 32 is set from approximately 1.000:0.500 to approximately 1.000:0.750 in the second filter 35 and the third filter 36 respectively.

Also, because the bands in which the filter group 3 has transmission characteristics are the visible region and approximately 800 nm to approximately 900 nm, transmission only in bands constituted by a visible region (in the present embodiment, approx. 420 nm to approx. 650 nm) and approximately 800 nm to approximately 900 nm of an infrared region close to this visible region that is not normally realizable by combining two filters is realized though the combination of the first filter 33 and the plurality of filters. Thus, it is possible to accommodate the main center wavelength (in the present embodiment, approx. 850 nm) of the infrared LED lamp 15 for use in night image capture, and to reliably block unnecessary near and far infrared light outside these wavelength bands. As a result, the present invention enables transmission in an infrared region using an LED light source such as the LED lamp 15, and is suitable for image capture under night vision conditions such as at night.

Also, because the plurality of filters is constituted by the second filter 35 whose blocking characteristics are set in a band between approximately 600 nm and approximately 750 nm (blocking band: approx. 650 nm to approx. 740 nm) and the third filter 36 whose blocking characteristics are set in a band between approximately 700 nm and approximately 900 nm (blocking band: approx. 700 nm to approx. 800 nm), the band in which blocking characteristics are obtained between the two transmission bands can be set to a refractive index of 3% or less, without causing light ripple in an adjacent near infrared region from a reactive portion of the (bright ambient) sensitivity characteristics of the human eye (in the present embodiment, to an adjustment portion of the center wavelength of an LED lamp whose light intensity has a center wavelength of approx. 850 nm). Note that, specifically, in the case where the blocking characteristics of the second filter 35 are set in a band between approximately 650 nm and approximately 740 nm and the blocking characteristics of the third filter 36 are set in a band between approximately 700 nm and approximately 800 nm, light from an LED lamp whose light intensity has a center wavelength of approximately 840 nm can be efficiently captured.

Also, in the filter group 3, inclusion of the adjustment layer 34 in a position where refractive index changes enables the occurrence of ripple to be suppressed, particularly the occurrence of ripple in a wavelength region that is to be transmitted, and the amount by which transmissivity shifts when sharply displaced can also be suppressed.

Also, the present embodiment enables the transmission width in the infrared region to be set to a short desired width, such that the transmission width in the infrared region is approximately 100 nm. Specifically, only the wavelengths of light from the infrared LED lamp 15 for use in night image capture (irradiation wavelength width of approx. about 100 nm) can be transmitted, enabling light irradiated from the LED lamp 15 and reflected by the object to be efficiently captured.

Also, as described above, the imaging device 1 according to the present embodiment enables image capture to be performed not only during the day with natural light but also under night vision conditions such as at night using a simple configuration. That is, image capture performed during the day with the aim of cutting infrared light and image capture performed under night vision conditions such as at night without aiming to cutting infrared light can be suitably performed without changing the optical path length.

Also, the imaging device 1 according to the present embodiment enables transmission in a desired band of the infrared region as well as in the visible region, because at least the lens 12, the optical filter 13 and the imaging element 14 are arranged in order along the optical axis 11 from the object side on the outside, and, as a result, enables image capture to be performed not only during the day with natural light but also under night vision conditions such as at night.

Note that in the above present embodiment a filter group 3 having 49 layers was described, but the number of layers of the filter group 3 is not limited thereto, and can be arbitrarily set.

Also, in the present embodiment the quartz plate 2 is used as the transparent substrate, but the transparent substrate is not limited thereto, and may be, for example, a glass plate, as long as the substrate can transmit light. The quartz plate 2 is also not limited, and may be a single quartz plate such as a birefringent plate, for example, or a birefringent plate composed of a plurality of quartz plates. Also, the transparent substrate may be constituted by combining a quartz plate and a glass plate.

Also, in the present embodiment $TiO_2$ is used for the first thin film 31, but the present invention is not limited thereto, and the first thin film 31 can be composed of any high refractive index material, such as $Nb_2O_5$ or $Ta_2O_5$, for example. Note that because $Nb_2O_5$ and $Ta_2O_5$ have substantially the same refractive indices as $TiO_2$, similar effects to the above working example are obtained in the case where $Nb_2O_5$ or $Ta_2O_5$ is used for the first thin film 31.

Also, in the present embodiment $SiO_2$ is used for the second thin film 32, but the present invention is not limited thereto, and the second thin film 32 can be composed of any low refractive index material, such as $MgF_2$, for example.

Also, in the present embodiment the plurality of filters is constituted by the second filter 35 and the third filter 36, but this is intended as a favorable example that enables the thickness of the filter to be reduced, and the present invention is not limited thereto. For example, the plurality of filters may be constituted by three or more filters, in which case the transmission band can be further designed with a high degree of freedom.

Also, in the present embodiment the filter group 3 is formed on the quartz plate 2 by vacuum deposition, but the present invention is not limited thereto, and the filter group 3 may be formed on the quartz plate 2 by another technique such as ion-assisted deposition or sputtering.

Also, in the present embodiment the filter group 3 is provided on one main face 21 (one face) of the quartz plate 2, but the present invention is not limited thereto, and the filter group 3 may be provided both main faces (the one main face 21 and the other main face 22) of the quartz plate 2.

Also, in the present embodiment, the near infrared band in which the filter group 3 has transmission characteristics in a near infrared region that is near the visible region is approximately 100 nm from approximately 800 nm to approximately 900 nm, but this is intended as a favorable example using the infrared LED lamp 15, and the present invention is not limited thereto, with similar effects being obtained by setting the transmission width in the infrared region within a range of approximately 65 nm to 200 nm.

Hereinafter, specific examples (Working Examples 2 to 4) will be illustrated in which the transmission width in an infrared region is set within a range of approximately 65 nm to 200 nm. Note that in the following Working Examples 2 to 5 the transmission band and blocking region differ in comparison to the above Working Example 1, although this is merely due to a design change.

WORKING EXAMPLE 2

In Working Example 2, the filter group 3 differs from the above Working Example 1. Operations, effects and modifications relating to the configuration that is the same as Working Example 1 are therefore similar to the operations, effects and modifications of the above Working Example 1. In view of this, in Working Example 2, the configuration that differs from the above Working Example 1 will be described, while description of the configuration that is the same will be omitted.

Figure 8:
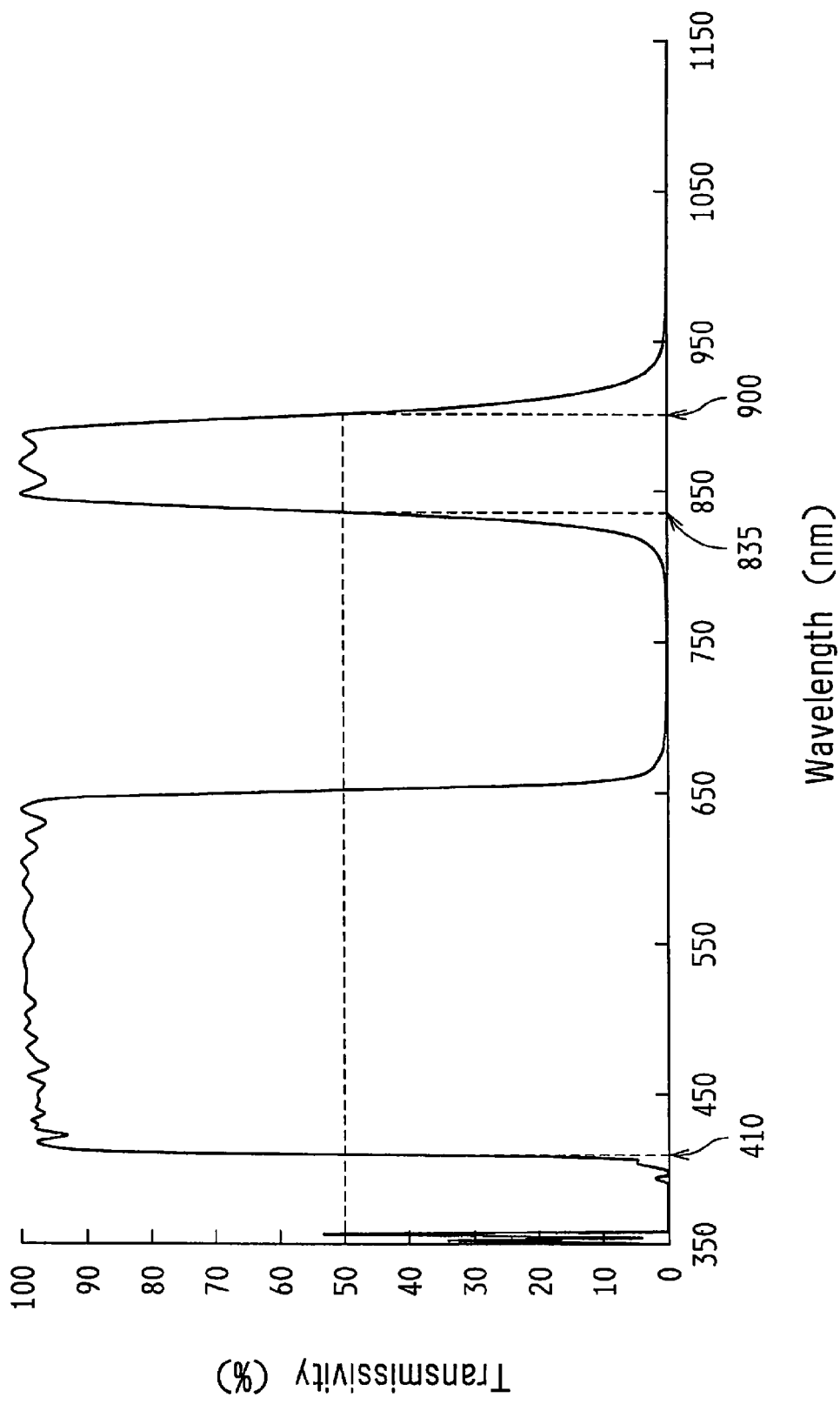
FIG. 8 shows transmission characteristics of an optical filter according to Working Example 2.

As shown in FIG. 8, the optical filter 13 according to Working Example 2 transmits (at least 90% transmissivity) light of wavelengths from approximately 410 nm to approximately 650 nm constituting a visible region, transmits (at least 90% transmissivity) light of wavelengths in a band of approximately 65 nm from approximately 835 nm to approximately 900 nm constituting an infrared region (in particular, near infrared region), and blocks the remaining bands. Note that in Working Example 2 a half-peak wavelength having a refractive index of 50% is taken as the critical value (upper and lower limit) of the transmission band and the blocking band.

Looking now at the filter group 3, the first filter 33 has transmission characteristics in one preset band (approx. 410 nm to approx. 900 nm) of the infrared region that is contiguous with a visible region, and has blocking characteristics below approximately 410 nm and above approximately 900 nm.

Also, the plurality of filters is constituted by a second filter 35 whose blocking characteristics are set in a band between approximately 650 nm and approximately 750 nm, and a third filter 36 whose blocking characteristics are set in a band between approximately 725 nm and approximately 835 nm, with the bands in which blocking characteristics are obtained each being approximately 100 nm or less, and overlapping.

The second filter 35 has transmission characteristics in a visible region (approx. 390 nm to approx. 650 nm) and another preset band (above approx. 750 nm) of an infrared region that is removed from the visible region, and has blocking characteristics in a band (approx. 650 nm to approx. 750 nm) between the visible region and the other band of the infrared region.

The third filter 36 has transmission characteristics in a visible region (approx. 410 nm to approx. 725 nm) and another preset band (above approx. 835 nm) of an infrared region that is removed from the visible region, and has blocking characteristics in a band (approx. 725 nm to approx. 835 nm) between the visible region and the other band of the infrared region.

The optical filter 13 according to Working Example 3 composed of the above configuration enables transmission characteristics to be obtained only in the visible region and a band at or below approximately 900 nm that is close to but removed from the visible region, as shown in FIG. 8.

WORKING EXAMPLE 3

In Working Example 3, the filter group 3 differs from the above Working Example 1. Operations, effects and modifications relating to the configuration that is the same as Working Example 1 are therefore similar to the operations, effects and modifications of the above Working Example 1. In view of this, in Working Example 3, the configuration that differs from the above Working Example 1 will be described, while description of the configuration that is the same will be omitted.

Figure 9:
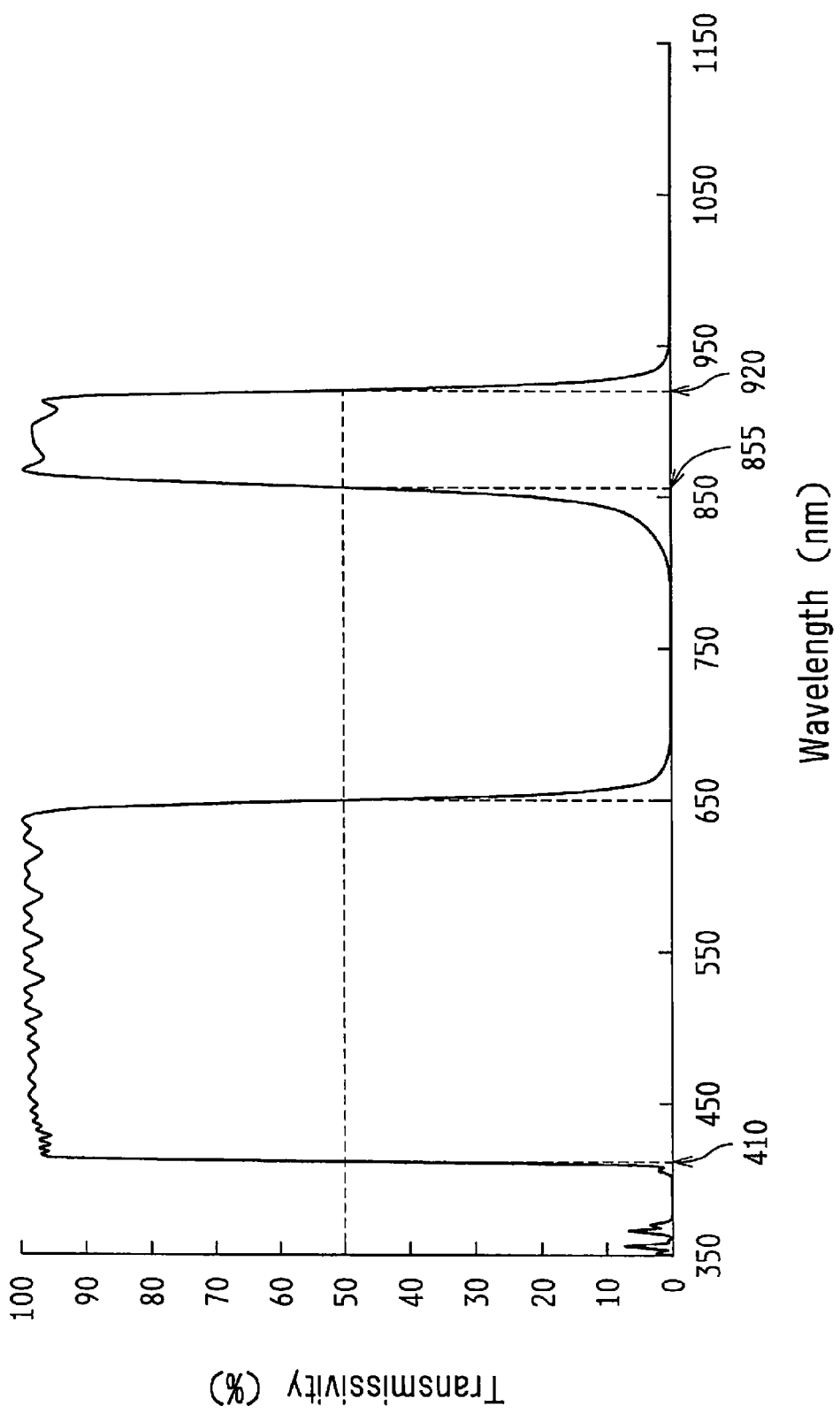
FIG. 9 shows transmission characteristics of an optical filter according to Working Example 3.

As shown in FIG. 9, the optical filter 13 according to Working Example 3 transmits (at least 90% transmissivity) light of wavelengths from approximately 410 nm to approximately 650 nm constituting a visible region, transmits (at least 90% transmissivity) light of wavelengths in a band of approximately 65 nm from approximately 855 nm to approximately 920 nm constituting an infrared region (in particular, near infrared region), and blocks the remaining bands. Note that in Working Example 3 a half-peak wavelength having a refractive index of 50% is taken as the critical value (upper and lower limit) of the transmission band and the blocking band.

Looking now at the filter group 3, the first filter 33 has transmission characteristics in one preset band (approx. 410 nm to approx. 920 nm) of the infrared region that is contiguous with the visible region, and has blocking characteristics below approximately 410 nm and above approximately 920 nm.

Also, the plurality of filters is constituted by a second filter 35 whose blocking characteristics are set in a band between approximately 650 nm and approximately 750 nm, and a third filter 36 whose blocking characteristics are set in a band between approximately 745 nm and approximately 855 nm, with the bands in which blocking characteristics are obtained each being approximately 100 nm or less, and overlapping.

The second filter 35 has transmission characteristics in a visible region (approx. 390 nm to approx. 650 nm) and another preset band (above approx. 750 nm) of an infrared region that is removed from the visible region, and has blocking characteristics in a band (approx. 650 nm to approx. 750 nm) between the visible region and the other band of the infrared region.

The third filter 36 has transmission characteristics in a visible region (approx. 410 nm to approx. 745 nm) and another preset band (above approx. 855 nm) of an infrared region that is removed from the visible region, and has blocking characteristics in a band (approx. 745 nm to approx. 855 nm) between the visible region and the other band of the infrared region.

The optical filter 13 according to Working Example 3 composed of the above configuration enables transmission characteristics to be obtained only in the visible region and a band at or below approximately 900 nm that is close to but removed from the visible region, as shown in FIG. 9.

WORKING EXAMPLE 4

In Working Example 4, the filter group 3 differs from the above Working Example 1. Operations, effects and modifications relating to the configuration that is the same as Working Example 1 are therefore similar to the operations, effects and modifications of the above Working Example 1. In view of this, in Working Example 4, the configuration that differs from the above Working Example 1 will be described, while description of the configuration that is the same will be omitted.

Figure 10:
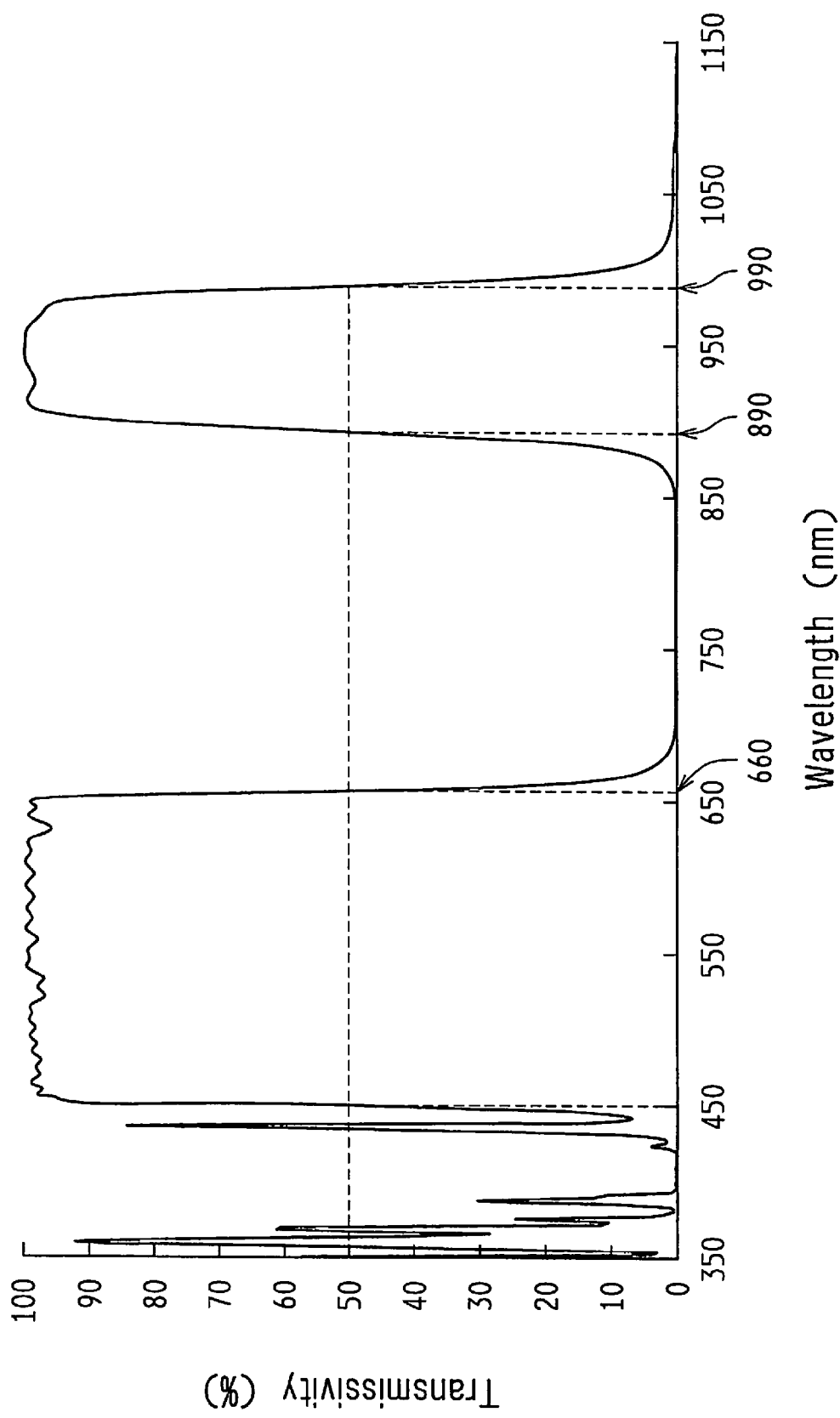
FIG. 10 shows transmission characteristics of an optical filter according to Working Example 4.

As shown in FIG. 10, the optical filter 13 according to Working Example 4 transmits (at least 90% transmissivity) light of wavelengths from approximately 450 nm to approximately 660 nm constituting a visible region, transmits (at least 90% transmissivity) light of wavelengths in a band of approximately 100 nm from approximately 890 nm to approximately 990 nm constituting an infrared region (in particular, near infrared region), and blocks the remaining bands. Note that in Working Example 4 a half-peak wavelength having a refractive index of 50% is taken as the critical value (upper and lower limit) of the transmission band and the blocking band.

Looking now at the filter group 3, the first filter 33 has transmission characteristics in one preset band (approx. 450 nm to approx. 990 nm) of the infrared region that is contiguous with the visible region, and has blocking characteristics below approximately 450 nm and above approximately 990 mm.

Also, the plurality of filters is constituted by a second filter 35 whose blocking characteristics are set in a band between approximately 660 nm and approximately 760 nm, a third filter 36 whose blocking characteristics are set in a band between approximately 715 nm and approximately 815 nm, and a fourth filter whose blocking characteristics are set in a band between approximately 770 nm and approximately 890 nm, with the bands in which blocking characteristics are obtained each being approximately 100 nm or less, and overlapping.

The second filter 35 has transmission characteristics in a visible region (approx. 390 nm to approx. 660 nm) and another preset band (above approx. 760 nm) of an infrared region that is removed from the visible region, and has blocking characteristics in a band (approx. 660 nm to approx. 760 nm) between the visible region and the other band of the infrared region.

The third filter 36 has transmission characteristics in a visible region (approx. 410 nm to approx. 715 nm) and another preset band (above approx. 815 nm) of an infrared region that is removed from the visible region, and has blocking characteristics in a band (approx. 715 nm to approx. 815 nm) between the visible region and the other band of the infrared region.

The fourth filter has transmission characteristics in a visible region (approx. 450 nm to approx. 770 nm) and another preset band (above approx. 890 nm) of an infrared region that is removed from the visible region, and has blocking characteristics in a band (approx. 770 nm to approx. 890 nm) between the visible region and the other band of the infrared region.

The optical filter 13 according to Working Example 5 composed of the above configuration enables transmission characteristics to be obtained in the visible region and approximately 890 nm to approximately 990 nm including a band at or below approximately 900 nm that is close to but removed from the visible region, as shown in FIG. 10.

The present invention may be embodied in other forms without departing from the spirit, gist or essential characteristics thereof. The foregoing embodiments are therefore to be considered in all respects as illustrative and not restrictive, the scope of the invention being indicated by the appended claims rather than by the foregoing description, and all changes that come within the meaning and range of equivalency of the claims are intended to be embraced therein.

This application claims priority under 35 U.S.C. §119(a) on Patent Application No. 2009-213348 filed in Japan on Sep. 15, 2009, the entire contents of which are herein incorporated by reference.

INDUSTRIAL APPLICABILITY

The present invention is suitable for an imaging device such as a camera that is used both during the day and night, examples of which include a surveillance camera or an in-vehicle camera.

DESCRIPTION OF REFERENCE NUMERALS

1:Imaging device
11:Optical axis
12:Lens
13:Optical filter
14:Imaging element
15:LED lamp
2:Quartz plate
21:One main face
22:Other main face
3:Filter group
31:First thin film
32:Second thin film
33:First filter
34:Adjustment layer
35:Second filter
36:Third filter

The invention claimed is:

1. An optical filter for providing in an imaging device, comprising:
a transparent substrate; and
a filter group formed on the transparent substrate and having transmission characteristics consisting of two wavelength bands in a visible region and in an infrared region, wherein a width of the wavelength bands at 50% transmission is between approximately 65 nm to approximately 200 nm, and the wavelength band in the infrared region is between approximately 800 nm to approximately 1000 nm,
wherein the two wavelength bands are separated by a blocking characteristics band,
wherein the filter group is constituted by combining a first filter having a continuous transmission band in the visible region and one preset band of the infrared region, and a plurality of filters each having transmission characteristics in the visible region and another preset band of the infrared region and each having a blocking wavelength band between the visible region and the another preset band of the infrared region, and
wherein, in the plurality of filters, each of the blocking wavelength bands has a bandwidth of approximately 150 nm or less, and the blocking characteristics band is obtained by an overlap of the blocking wavelength bands of each of the plurality of filters.

2. The optical filter according to claim 1,
wherein the filter group includes a plurality of layers formed by alternately laminating a first thin film composed of a high refractive index material and a second thin film composed of a low refractive index material,
the high refractive index material is one of $TiO_2$, $Nb_2O_5$ and $Ta_2O_5$, and
the low refractive index material is one of $SiO_2$ and $MgF_2$.

3. The optical filter according to claim 1,
wherein the plurality of filters are composed of a second filter whose blocking wavelength band is set between approximately 600 nm and approximately 750 nm, and a third filter whose blocking wavelength band is set between approximately 700 nm and approximately 900 nm.

4. The optical filter according to claim 1,
wherein the filter group includes an adjustment layer that is positioned between the plurality of filters and a quartz plate.

5. An imaging device comprising the optical filter according to claim 1.

6. An optical system used in a camera, the optical system comprising the optical filter according to claim 1.

7. The optical filter according to claim 1,
wherein the wavelength band in the infrared region in which the filter group has the transmission characteristics is approximately 800 to 900 nm.

8. The optical filter according to claim 1,
wherein the wavelength band in the infrared region in which the filter group has the transmission characteristics is approximately 855 to 920 nm.

9. The optical filter according to claim 1,
wherein the wavelength band in the infrared region in which the filter group has the transmission characteristics is approximately 890 to 990 nm.

* * * * *